United States Patent [19]
Chen

[11] Patent Number: 5,151,823
[45] Date of Patent: Sep. 29, 1992

[54] BIOCULAR EYEPIECE OPTICAL SYSTEM EMPLOYING REFRACTIVE AND DIFFRACTIVE OPTICAL ELEMENTS

[75] Inventor: Chungte W. Chen, Irvine, Calif.

[73] Assignee: Hughes Aircraft Company, Los Angeles, Calif.

[21] Appl. No.: 764,285

[22] Filed: Sep. 23, 1991

[51] Int. Cl.[5] .................. G02B 5/18; G02B 3/02; G02B 3/08; G02B 9/14

[52] U.S. Cl. .................... 359/565; 359/566; 359/570; 359/650; 359/651; 359/742; 359/774; 359/785

[58] Field of Search .............. 359/643, 645, 650, 649, 359/651, 558, 565, 566, 569, 570, 571, 741, 742, 785, 786, 788, 774, 630, 13

[56] References Cited

U.S. PATENT DOCUMENTS

| | | | |
|---|---|---|---|
| 3,614,209 | 10/1971 | Seaman | 359/643 |
| 3,922,072 | 11/1975 | Rogers. | |
| 4,183,624 | 1/1980 | Rogers et al. | |
| 4,895,790 | 1/1990 | Swanson et al. | 359/570 X |
| 5,013,133 | 5/1991 | Buralli et al. | 359/565 X |
| 5,044,706 | 9/1991 | Chen | 359/571 X |
| 5,061,052 | 10/1991 | De Jesus | 359/742 |

OTHER PUBLICATIONS

"Infrared Applications of Diffractive Optical Elements", by Gary J. Swanson and Wilfrid B. Veldkamp, SPIF Proceedings, vol. 815, Paper No. 22, 1988.

Primary Examiner—Constantine Hannaher
Assistant Examiner—Edward J. Glick
Attorney, Agent, or Firm—William J. Streeter; G. S. Grunebach; W. K. Denson-Low

[57] ABSTRACT

In one embodiment, a three-element biocular eyepiece system 40 having a first optical element 42 with at least one diffractive surface 44, a second optical element 48 having a refracting convex surface 50 and a refracting concave surface b 52 is provided. A third optical element 54 having a refracting convex surface 56 and a refracting convex surface 58 is also employed. In another embodiment, a four-element biocular system 60 is disclosed as having an optical element 62 having a refracting concave surface 64 and a refracting convex surface 66, a refractive-diffractive hybrid optical element 68 having a diffractive surface 70 and a refracting convex surface 72, an optical element 74 having a refracting convex surface 76 and a refracting concave surface 78, and an optical element 80 having a refracting concave surface 82 and a refracting convex surface 84. The diffractive surfaces 44 and 70 have a kinoform profile 102a–d or approximated kinoform profiles 112a–d and 122a–d. Both versions of the biocular eyepiece 40 and 60 provide a biocular eyepiece which has fewer lens elements and a shorter overall length than conventional designs. Both versions of the biocular eyepiece 40 and 60 may be used in combination with a cathode ray tube 12 for magnification of images generated therein.

17 Claims, 5 Drawing Sheets

BIOCULAR EYEPIECE OPTICAL SYSTEM EMPLOYING REFRACTIVE AND DIFFRACTIVE OPTICAL ELEMENTS

FIELD OF THE INVENTION

This invention relates generally to a biocular eyepiece system, and more specifically, to a biocular eyepiece system employing refractive and diffractive optical elements.

BACKGROUND OF THE INVENTION

A biocular eyepiece is an optical system which may be viewed by an observer with both eyes. The observer may look through different parts of the same optical system without any discontinuity. The device has been widely accepted as a means to magnify the image of a cathode ray tube (CRT), an image intensifier, or a forward looking infrared system (FLIR). It has also been widely used in head-up and head-down displays for both modern military and commercial aircraft, flight simulators, microscopes for semiconductor device inspection, and medical applications. The chief advantage of using a biocular eyepiece, as compared to a monocular eyepiece or a binocular eyepiece, is that the observer is able to freely move his head and use both eyes to see essentially the same image at the same light level on the same optical system.

Classical biocular eyepieces such as those disclosed in U.S. Pat. Nos. 3,922,072 and 4,183,624 require at least five to six refractive optical elements and generally have an overall length about twice that of the effective focal length. In some applications the overall length of these designs can lead to problems. For example, a desirable feature of equipment used in aircraft is a minimal space requirement such that more equipment may be used in a limited space. The fact that optical systems require five to six optical elements make conventional optical systems relatively heavy. In addition, the cost of a biocular system increases with the number of lens elements. The known biocular eyepiece design consists of several focusing lenses and at least one negative optical power element for chromatic aberration correction and field curvature reduction. When a biocular eyepiece of the conventional design deviates from the stated design conditions, the chromatic aberration, higher order aberration, field curvature, and distortion will be aggravated.

At least one attempt to reduce the number of elements in a conventional biocular eyepiece employed a curved CRT fiber faceplate to reduce the field curvature. A reduced spectral band emission minimized the chromatic aberration. Unfortunately, an unconventional CRT adds a significant amount of cost to the system. More importantly, the operating voltage of the CRT usually needs to be increased to compensate the loss of brightness associated with this design. The lifetime of the CRT is therefore reduced. Presently, it is generally recognized that it is a poor substitute to curve and distort the object in order to compensate for the deficiencies of the optical system.

What is needed is a simple biocular eyepiece which yields a performance that is comparable or better than conventional eyepieces, but with fewer optical elements contained in a more compact size. It is an object of the preferred embodiment of this invention to provide such an apparatus.

SUMMARY OF THE INVENTION

The preferred embodiments of the invention disclosure is a three-element and a four-element biocular eyepiece employing refractive and refractive-diffractive hybrid optical elements. The combination of refractive and refractive-diffractive hybrid optical elements yields a biocular eyepiece with comparable image quality, but having fewer lens elements, smaller size, and less weight than the aforementioned prior art designs. The reduction of the total number of elements can shorten the overall length of the biocular eyepiece by as much as 15 percent.

The first embodiment of this apparatus is a three-element biocular eyepiece. A diffractive surface is etched onto a lens surface facing the object needing magnification. Using the diffractive optical surface in this position, the biocular eyepiece is more effective in correcting chromatic aberration such as lateral color, axial color, spherochromatism, and chromatic coma. This combination also yields better correction in field curvature and astigmatism as compared to classical biocular eyepieces.

A second embodiment is a four-element optical construction. The diffractive optical surface is etched onto the third element from the entrance pupil. Improvement in image quality is also realized in this embodiment.

The present invention greatly simplifies biocular eyepiece designs. In places of industrial and medical application the need for a simplified, high quality, biocular eyepiece can be met. Additional objects, advantages and features of the present invention will become apparent from the following description and appended claims, taken in conjunction with the accompanying drawings.

DETAILED DESCRIPTION OF THE PREFERRED EMBODIMENTS

It should be understood that the following description of the preferred embodiments are merely exemplary in nature and are in no way intended to limit the invention or its application or uses.

Figure 1:
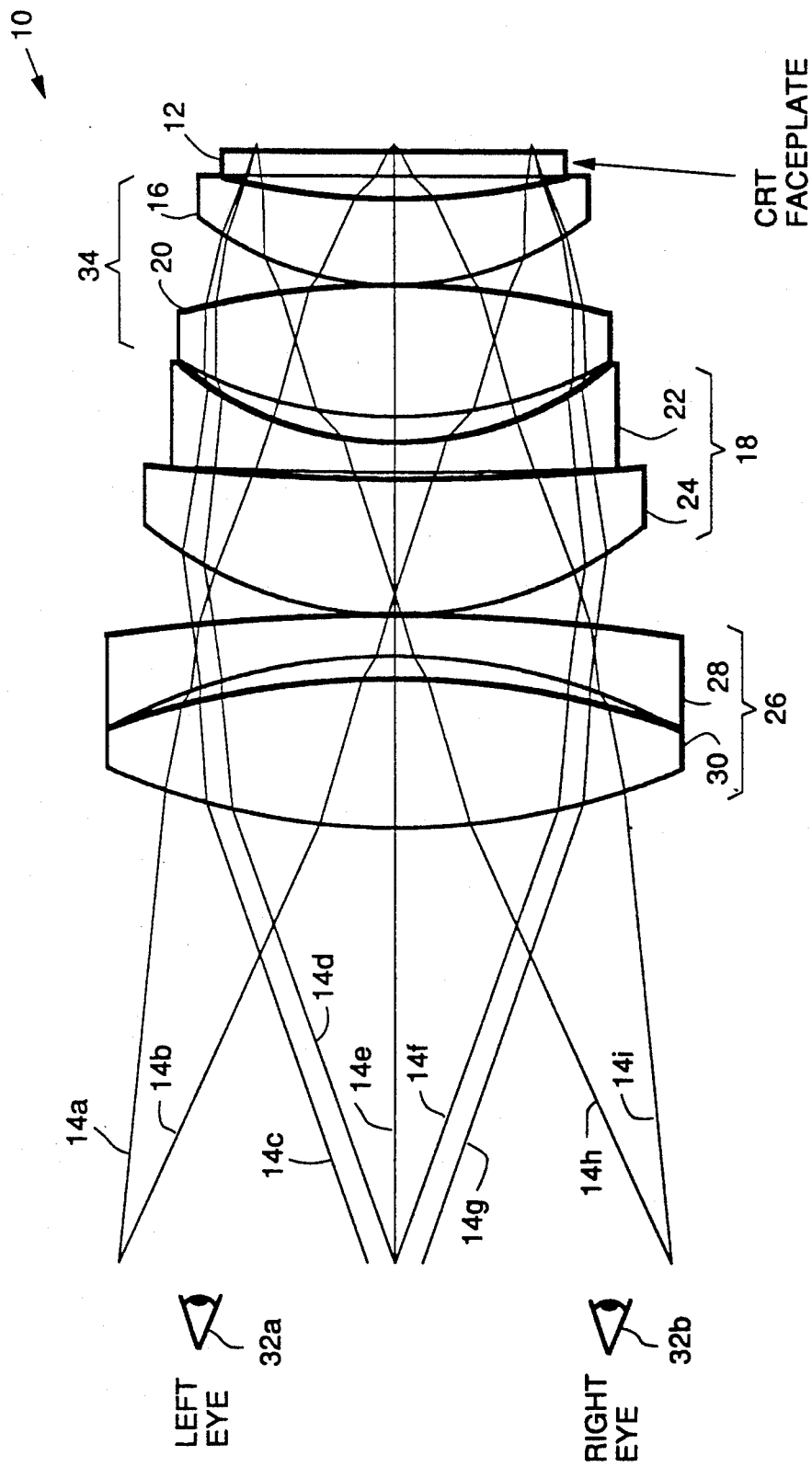
FIG. 1 is a biocular eyepiece of the prior art using conventional refractive lenses.

FIG. 1 shows a conventional biocular eyepiece 10 in use with a cathode ray tube (CRT) faceplate 12. The CRT faceplate 12 emits light, shown as rays 14a-i. The rays symbolically represent light passing through the optical system and function as a fundamental lens design tool, called analytical ray tracing. One skilled in the art would understand that the rays are sequentially traced through a series of refracting surfaces and thereby yield a measurement of the performance of the lens system. The principal ray 14e defines the optical axis of the lens system. This ray passes through the lenses unrefracted since its angle of incidence at each lens surface is zero degrees. It is important to note that the optical axis does not necessarily have to be straight and may be bent if the principal ray 14e reflected or refracted at an angle. However for purposes of illustration, the principal ray 14e is not deviated.

The biocular eyepiece 10 has lens groups 18, 26, 34 and a face plate 12 which is typically part of the CRT assembly (not shown). The first lens group 26 has a bi-convex lens 30 and a concave-convex lens 28, which provide a portion of the whole lens power. In some cases, lens group 26 may be convergent, neutral, or divergent. The primary function of the first lens group 26 is to correct the spherical aberration and chromatic aberration. The lens group 18 has a convex-concave convergent lens 24 and a convex-concave divergent lens 22. Lens group 18 taken in conjunction with lens group 26 provides the majority of the optical power of a biocular eyepiece 10. In addition, lens element 22 may be used to further correct longitudinal chromatic aberration. The third lens group 34 has a bi-convex convergent optical element 20 and the convex-concave convergent optical element 16 which minimizes the geometric distortion. To minimize the field curvature, a high index glass material is generally used for elements 16 and 20.

In typical biocular eyepieces, the F-number is generally faster than F/1.0 and the correction of spherical aberration, longitudinal chromatic aberration and spherochromatism is necessary for satisfactory imaging. If the spherical aberration is not corrected, then an observer will experience image swinging when moving his eyes 32a and 32b. The longitudinal chromatic aberration and spherochromatism must be corrected or otherwise eye strain will occur. These problems have resulted in relatively complex conventional biocular eyepieces. Indeed, this is why a biocular eyepiece of the prior art is relatively complex.

Figure 2:
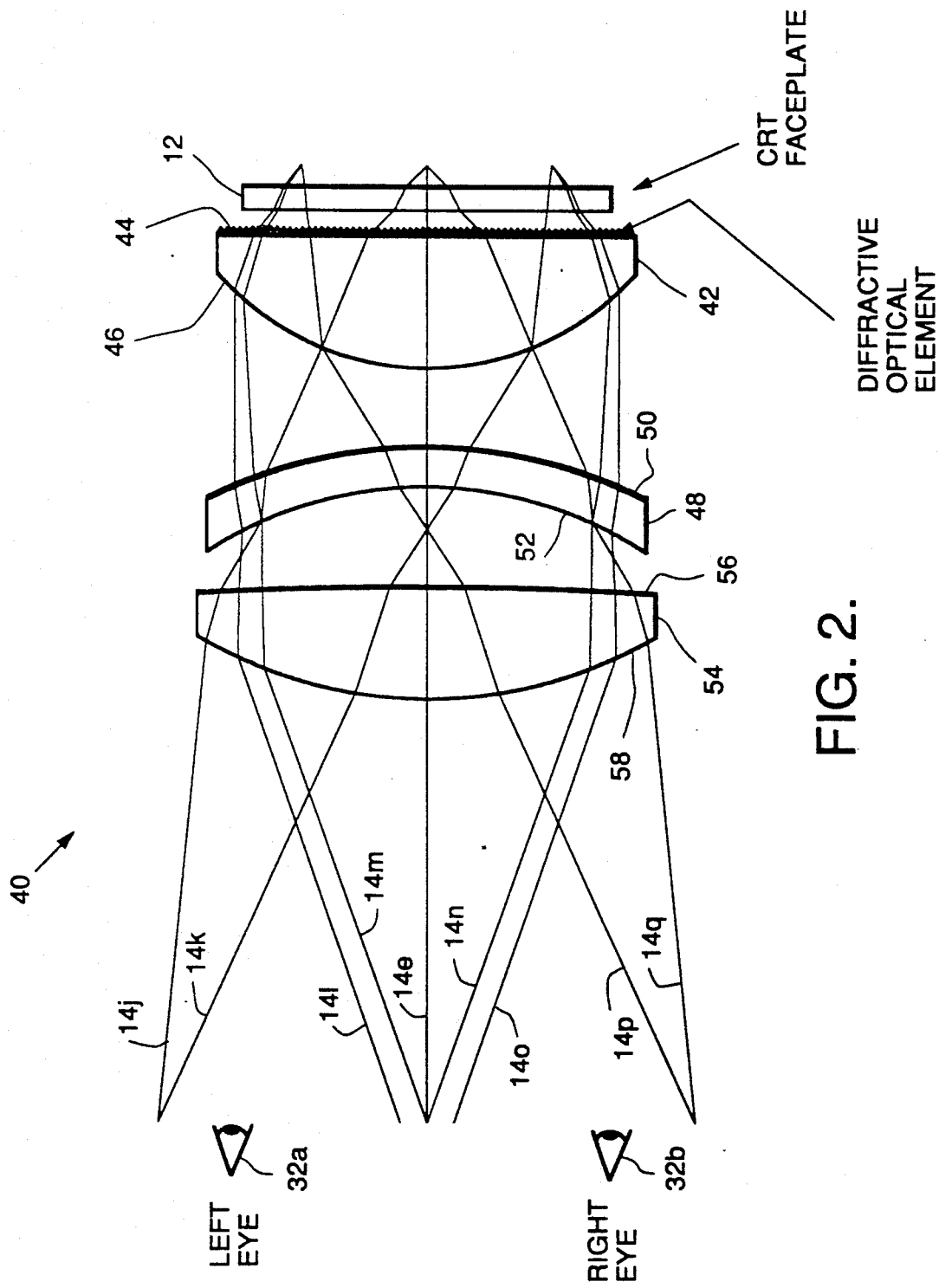
FIG. 2 is a three-element biocular eyepiece utilizing both refractive and refractive-diffractive hybrid optical elements in accordance with a first embodiment of this invention.

FIG. 2 shows a three element biocular system 40 of the present invention in conjunction with the CRT faceplate 12. The faceplate emits optical radiation which is shown symbolically as rays 14j-q. The first optical element 54 has a refracting convex surface 56, a refracting convex surface 58, and provides a substantial proportion of the optical power of the biocular eyepiece system 40. Optical element 48 is a divergent lens having a convex refracting surface 50, a concave refracting surface 52, and is used to correct the spherical aberration and longitudinal chromatic aberration of the lens element 54. Optical element 42 is a refractive-diffractive hybrid lens with a diffractive surface 44 and a refracting convex surface 46, which minimizes the geometric distortion of optical elements 54 and 48. Optical element 42 taken in conjunction with the divergent element 48 is used to correct longitudinal and lateral chromatic aberration. In addition, optical element 42 corrects the higher order lateral chromatic aberrations.

Furthermore, optical element 42 is an achromat in which the refractive surface 46 provides the majority of the optical power of the achromat and the diffractive surface 44 provides the correction for chromatic aberration in both first and higher orders. The diffractive surface 44 can be formed on any shape of the surface such as spherical, aspherical, or asymmetric, but a planar surface is generally preferred to simplify the fabrication processes. The correction of higher order chromatic aberration by optical element 42 is achieved through varying the grating spacing of the diffractive surface 44. From the principle of the holography, it is equivalent to store higher order wavefront information in the diffractive optical element.

Figure 3:
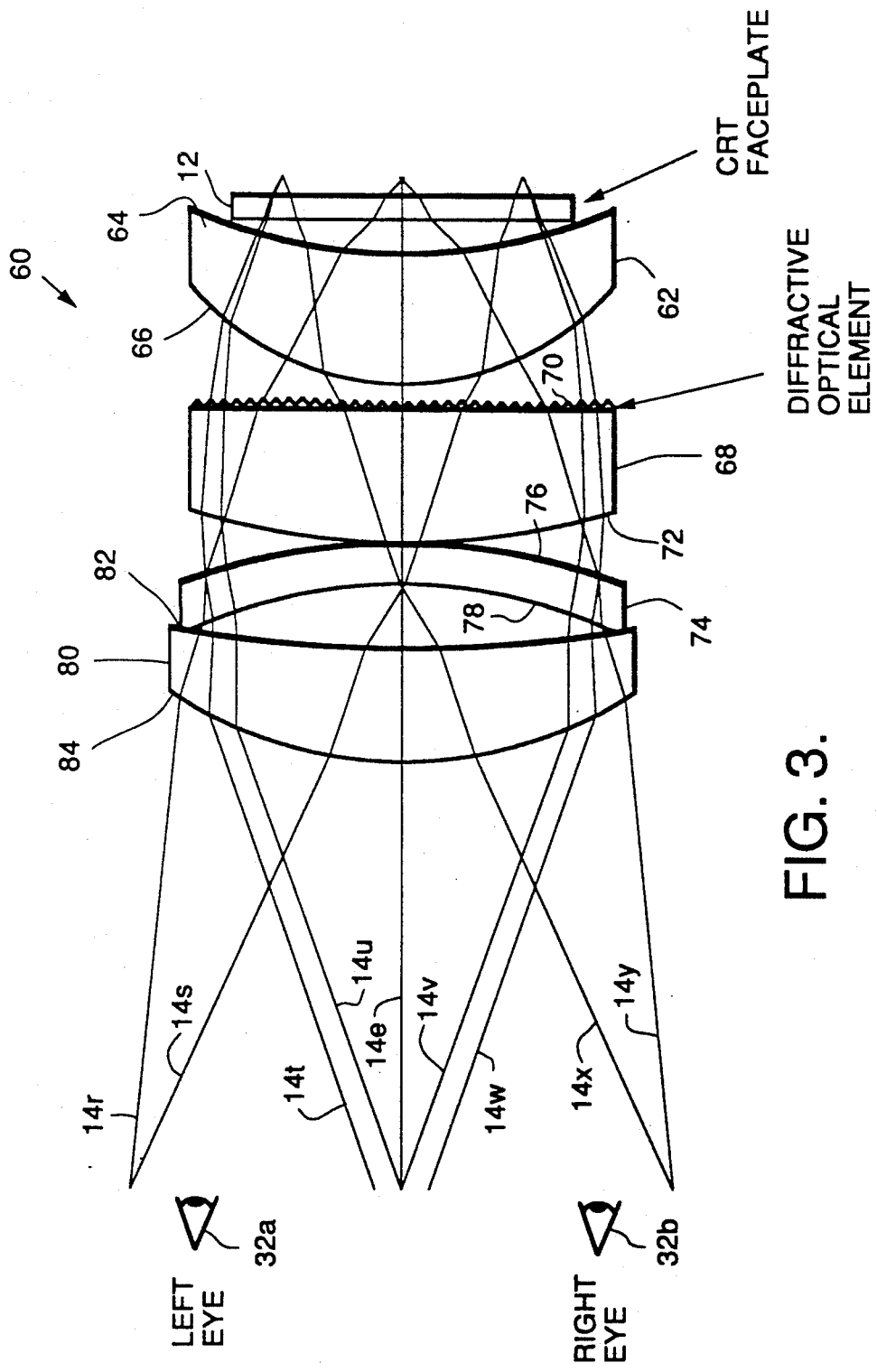
FIG. 3 is a four-element biocular eyepiece employing refractive and refractive-diffractive hybrid optical elements in accordance with another embodiment of this invention.

FIG. 3 shows a biocular eyepiece 60 in conjunction with the CRT faceplate 12 which emits optical radiation illustrated by rays 14r-y. Optical element 80 has a refracting concave surface 82, a refracting convex surface 84 and provides a substantial portion of the optical power. Optical element 74 has a refracting convex surface 76, a refracting concave surface 78, and is used to correct spherical aberration and longitudinal chromatic aberration.

Optical element 68 is a refractive-diffractive hybrid lens having a refracting convex surface 72 and a diffractive surface 70. Optical element 68 provides a portion of the total optical power and provides for the correction of lateral and longitudinal chromatic aberration. Optical element 62 has a refractive concave surface 64 and a refractive convex surface 66. Geometric distortion is minimized by optical element 68.

Figure 4A:
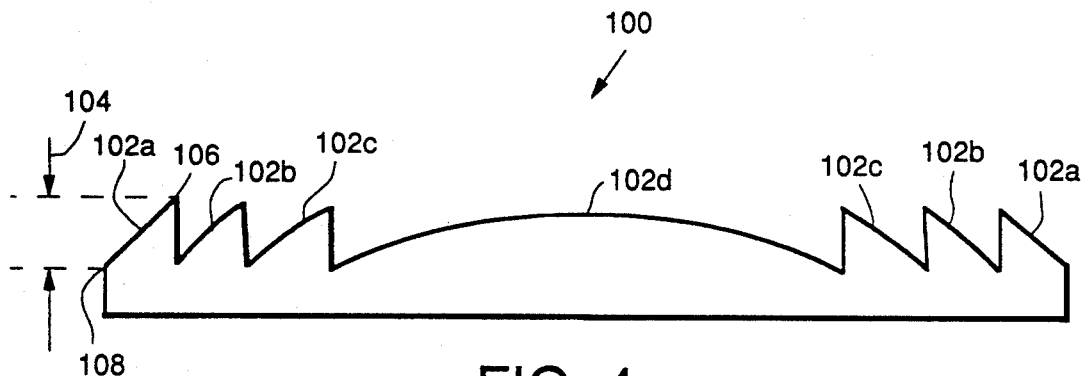
FIG. 4a is an enlarged cross-sectional view of a Fresnel phase plate having a kinoform diffractive surface and showing the microscopic details thereof.
Figure 5:
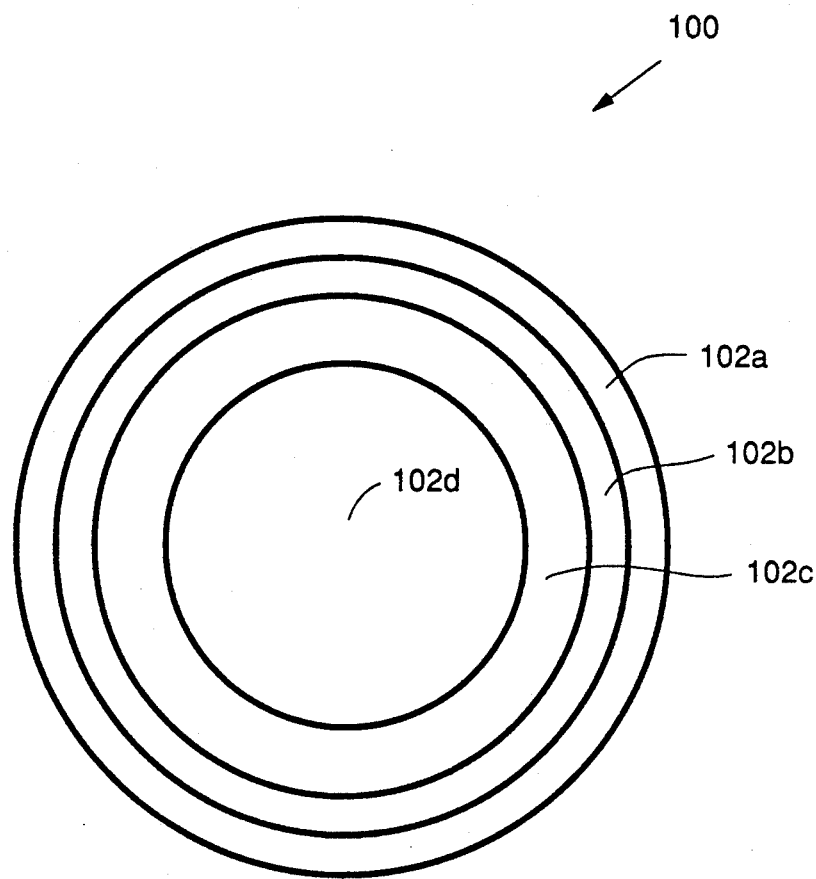
FIG. 5 is a front view of the diffractive Fresnel phase plate showing the concentric relationship of the diffractive rings.

FIGS. 4a and 5 show the microscopic detail of the diffractive surfaces 44 and 70 of the previous embodiments. The Fresnel phase plate 100 has several concentric rings which are shown to have kinoform phase profiles 102a-d. The kinoform Fresnel phase plate 100 may be used in the present invention because it has very high diffraction efficiency. The height dimension 104 is the distance between the highest point 106 and the lowest point 108 of the kinoform phase profiles 102a-d. In the present invention, the height dimension 104 is equal to $\lambda/(n-1)$ where is the average wavelength of the operating spectral band and n is the index of refraction of the lens. The height dimension 104 creates an optical path difference of one wave. The kinoform Fresnel plate has the advantage of theoretically perfect diffraction efficiency, but is difficult to manufacture. FIG. 5 illustrates the concentric nature of the kinoform phase profiles 102a-d and the Fresnel phase plate 100.

Figure 4B:
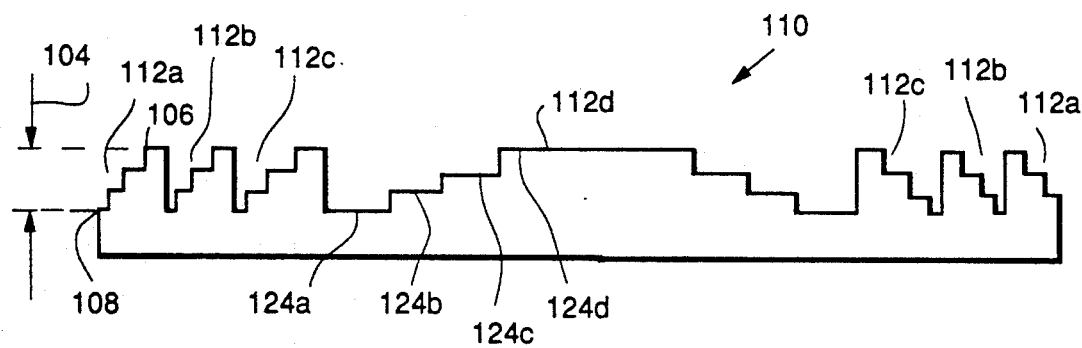
FIGS. 4b and 4c are enlarged cross-sectional views of binary optical elements having surfaces which approximate a kinoform diffractive surface and showing the microscopic details thereof.
Figure 4C:
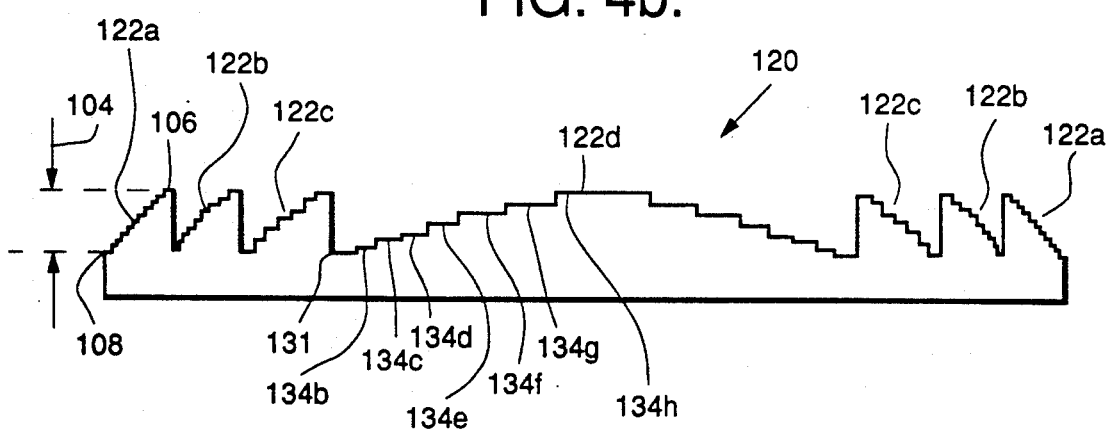

As shown in FIGS. 4b and 4c, the kinoform Fresnel phase plate 100 of FIG. 4a can be approximated by binary Fresnel zone plates 110 or 120, each having a multitude of concentric rings 112a-d and 122a-d. The binary Fresnel zone plate 110, also called a binary grating, has four levels 124a-d. In contrast, binary Fresnel zone plate 120 has eight levels 124a-h. It is important to note that the number of levels in a binary Fresnel zone plate will increase the theoretical diffraction efficiency. The theoretical diffraction efficiency of the Fresnel phase plate 100 is 100 percent and the theoretical diffraction efficiency for a 16 level binary Fresnel zone plate (not shown) approaches 99.0 percent. A binary Fresnel zone plate having 16 levels has been found to provide a good balance between diffraction efficiency and ability to manufacture. However, the present invention is not limited to a Fresnel phase plate or a binary grating and may be used with any optical element providing diffraction. The binary Fresnel zone plate having an approximated kinoform-type surface has been disclosed by Swanson and Veldcamp in "Infrared Application of Diffractive Optical Elements," SPIE Proceeding Vol. 815, paper #22, 1988.

The benefits associated with this novel refraction and diffractive biocular eyepiece can be summarized as follows:

1. A biocular eyepiece employing the combination of refractive and refractive-diffractive hybrid optical elements yields performance that is either comparable or better than that of conventional eyepieces, but with fewer optical elements and more compact in size;

2. Compared to the classical biocular eyepiece, the combination of refractive and refractive-diffractive hybrid optical elements is more effective in correcting chromatic aberration such as lateral color, axial color, spherochromatism and chromatic coma; and 3. The biocular eyepiece employing refractive and refractive-diffractive hybrid optical elements provides better correction of spherical aberration, field curvature and astigmatism.

Although the invention has been described with particular reference to certain preferred embodiments thereof, variations and modifications can be effected within the spirit and scope of the following claims.

What is claimed is:

1. A biocular eyepiece optical system comprising:
   a first optical element having at least one diffractive surface;
   a second optical element having at least one refractive surface;
   a third optical element having at least one refractive surface;
   the first, second, and third optical elements being generally disposed along an optical axis; and
   wherein the second optical element is optically intermediate the first and third optical element.

2. The optical system of claim 1, wherein the first optical element has first and second surfaces, the first surface being a diffractive surface and second surface being a refractive convex surface.

3. The optical system of claim 1 wherein the diffractive surface is a kinoform phase plate.

4. The optical system of claim 1 wherein the diffractive surface is a binary grating surface having a plurality of concentric rings.

5. The optical system of claim 1 wherein the diffractive surface is a binary grating surface having a plurality of concentric rings, each ring having a series of phase level steps for approximating a kinoform profile.

6. The optical system of claim 1, wherein the second optical element has third and fourth surfaces, the third surface being a refracting convex surface, and the fourth surface being a refracting concave surface.

7. The optical system of claim 1, wherein the third optical element has fifth and sixth surfaces, the fifth surface being a refractive surface and the sixth surface being a refractive convex surface.

8. The optical system of claim 6, wherein the second optical element provides correction of chromatic aberration.

9. A biocular eyepiece optical system comprising:
   a first optical element having first and second surfaces, the first surface being a diffractive surface and the second surface being a refractive convex surface;
   a second optical element having third and fourth surfaces, the third surface being a refracting convex surface and the fourth surface being a refracting concave surface; and
   a third optical element having a fifth and sixth surfaces, the fifth surface being a refractive and substantially planar surface and the sixth surface being a refractive convex surface.

10. A biocular eyepiece optical system comprising:
    a first optical element having at least one refractive surface;
    a second optical element having at least one refractive surface;
    a third optical element having at least one diffractive surface;
    a fourth optical element having at least one refractive surface;
    the first, second, and third optical elements being generally disposed along an optical axis; and
    wherein the second and third optical elements are optically intermediate the first and fourth optical elements.

11. The optical system of claim 10, wherein the first optical element has first and second surfaces, the first surface being a refractive concave surface and the second surface being a refractive convex surface.

12. The optical system of claim 10, wherein the second optical element has third and fourth surfaces, the third surface being a diffractive surface and the fourth surface being a refractive convex surface.

13. The optical system of claim 10, wherein the third optical element has fifth and sixth surfaces, the fifth surface being a refractive convex surface and the sixth surface being a refractive concave surface.

14. The optical system of claim 10, wherein the fourth optical element has a seventh and eighth surfaces, the seventh surface being a refracting concave surface and the eighth surface being a refracting convex surface.

15. The optical system of claim 12, wherein the third surface is a zone plate.

16. The optical system of claim 12, wherein the third surface is a binary grating surface comprising a plurality of concentric rings, each ring having a series of phase level steps for approximating a kinoform profile.

17. An optical system for magnifying the image on a cathode ray tube comprising:
    means for generating an image on a cathode ray tube;
    a first optical element having first and second surfaces, the first surface being a diffractive surface and second surface being a refractive convex surface;
    a second optical element having third and fourth surfaces, the third surface being a refracting convex surface and the fourth surface being a refracting concave surface;
    a third optical element having a fifth and sixth surfaces, the fifth surface being a refractive surface and the sixth surface being a refractive convex surface; and
    wherein the combination of the first, second and third optical elements cooperate to form a biocular eyepiece for magnifying the image on the cathode ray tube.

* * * * *